United States Patent
Frewein et al.

(10) Patent No.: US 12,067,709 B2
(45) Date of Patent: Aug. 20, 2024

(54) EXPANSION COEFFICIENT DETERMINATION WITH DEFORMATION MEASUREMENT AND SIMULATION

(71) Applicant: AT & S Austria Technologie & Systemtechnik AG, Leoben (AT)

(72) Inventors: Markus Frewein, Leoben (AT); Maike Sagerer, Leoben (AT); Julia Zuendel, Leoben (AT); Thomas Krivec, Zeltweg (AT)

(73) Assignee: AT&S Austria Technologie & Systemtechnik AG, Leoben (AT)

( * ) Notice: Subject to any disclaimer, the term of this patent is extended or adjusted under 35 U.S.C. 154(b) by 260 days.

(21) Appl. No.: 17/461,595

(22) Filed: Aug. 30, 2021

(65) Prior Publication Data
US 2022/0067904 A1 Mar. 3, 2022

(30) Foreign Application Priority Data
Sep. 2, 2020 (EP) .................................... 20194020

(51) Int. Cl.
*G06T 7/00* (2017.01)
*G01N 25/16* (2006.01)
(Continued)

(52) U.S. Cl.
CPC ............ *G06T 7/001* (2013.01); *G01N 25/16* (2013.01); *G06F 30/23* (2020.01); *G06T 7/593* (2017.01);
(Continued)

(58) Field of Classification Search
CPC G06T 7/001; G06T 7/593; G06T 7/60; G06T 2207/10012; G06T 2207/30108;
(Continued)

(56) References Cited

U.S. PATENT DOCUMENTS

| | | | |
|---|---|---|---|
| 5,131,758 A * | 7/1992 | Heyman | G01N 25/72 374/57 |
| 5,630,667 A * | 5/1997 | Ito | G01M 99/002 374/57 |

(Continued)

FOREIGN PATENT DOCUMENTS

| | | |
|---|---|---|
| CN | 104582252 | 4/2015 |
| CN | 110631906 | 12/2019 |

(Continued)

OTHER PUBLICATIONS

Gromala, et al., Comprehensive Material Characterization and Method of its Validation by Means of FEM Simulation, 2011. 12th International Conference on Thermal, Mechanical and Multiphysics Simulation and Experiments in Microelectronics and Microsystems.

(Continued)

*Primary Examiner* — Aaron W Carter
(74) *Attorney, Agent, or Firm* — ALG Intellectual Property, LLC

(57) ABSTRACT

A method for determining an expansion coefficient of a test material comprises: receiving first image data of a compound material, wherein the compound material comprises a plate and a layer of the test material, which is attached to the plate; receiving second image data of the compound material, which has been exposed to an environmental condition, before the second image data has been recorded; determining a measured deformation of the compound material by comparing the first image data and the second image data; and performing a simulated deformation of a model of the compound material exposed to the environmental condition and determining the expansion coefficient of the test material by varying the expansion coefficient until the simulate deformation conforms to the measured deformation.

11 Claims, 3 Drawing Sheets

(51) Int. Cl.
*G06F 30/23* (2020.01)
*G06T 7/593* (2017.01)
*G06T 7/60* (2017.01)
*G06V 10/75* (2022.01)

(52) U.S. Cl.
CPC .............. *G06T 7/60* (2013.01); *G06V 10/751* (2022.01); *G06T 2207/10012* (2013.01); *G06T 2207/30108* (2013.01)

(58) Field of Classification Search
CPC ................. G01N 25/16; G01N 17/002; G01N 2203/0218; G01N 2203/0226; G01N 2203/0236; G01N 2203/0242; G01N 2203/0647; G01N 2203/0682; G06F 30/23; G06F 2115/12; G06F 2119/08; G06F 30/39; G06V 10/751
See application file for complete search history.

(56) References Cited

U.S. PATENT DOCUMENTS

| | | | |
|---|---|---|---|
| 8,014,154 B2 | 9/2011 | Lee | |
| 2002/0054293 A1* | 5/2002 | Pang | G01N 21/898 356/430 |
| 2004/0128109 A1* | 7/2004 | Saito | F01D 21/003 702/185 |
| 2006/0036401 A1* | 2/2006 | Kobayashi | H05K 3/00 702/183 |
| 2007/0119619 A1 | 5/2007 | Nakamura | |
| 2008/0196927 A1 | 8/2008 | Lee | |
| 2009/0052835 A1 | 2/2009 | Okazaki | |
| 2009/0126974 A1* | 5/2009 | Yuasa | B29C 70/506 174/250 |
| 2009/0310848 A1* | 12/2009 | Dang | G06F 30/23 382/145 |
| 2009/0312960 A1* | 12/2009 | Dang | G06F 30/23 702/42 |
| 2010/0116530 A1* | 5/2010 | Okazaki | H05K 3/4688 174/250 |
| 2010/0294554 A1* | 11/2010 | Okazaki | H05K 3/4688 174/261 |
| 2012/0111624 A1 | 5/2012 | Maeda | |
| 2013/0107004 A1* | 5/2013 | Maeda | G01B 11/16 348/46 |
| 2013/0242520 A1 | 9/2013 | Onozuka | |
| 2014/0371587 A1* | 12/2014 | Vanderby | A61B 8/5246 600/443 |
| 2015/0343679 A1* | 12/2015 | Morohoshi | B29C 43/58 425/110 |
| 2016/0088729 A1 | 3/2016 | Kobuke | |
| 2017/0104979 A1* | 4/2017 | Shaw | H04N 13/239 |
| 2018/0087878 A1* | 3/2018 | Giorgio | F41H 5/0471 |
| 2018/0118901 A1 | 5/2018 | Harper et al. | |
| 2019/0008623 A1* | 1/2019 | Nemoto | A61L 27/48 |
| 2021/0118530 A1* | 4/2021 | Song | G16C 20/80 |
| 2022/0067904 A1* | 3/2022 | Frewein | G06V 10/751 |
| 2022/0130082 A1* | 4/2022 | Li | G06T 11/006 |
| 2022/0260504 A1* | 8/2022 | Funaya | H01L 24/85 |
| 2023/0105651 A1* | 4/2023 | Yuan | B29C 45/7693 264/40.1 |

FOREIGN PATENT DOCUMENTS

| | | |
|---|---|---|
| JP | 11-135953 | 5/1999 |
| JP | 2004156942 A | 6/2004 |
| JP | 2004245764 A | 9/2004 |
| KR | 20100131754 | 12/2010 |
| KR | 101285771 | 7/2013 |
| WO | 2019124062 | 6/2019 |

OTHER PUBLICATIONS

Tsai, et al., Warpage Analysis of Fan-Out Panel-Level Packaging Using Equivalent CTE, IEEE Transactions on Device and Materials Reliability, vol. 20, No. 1, Mar. 2020.

Zundel, et al., Panel Level Warpage Simulation of Printed Circuit Boards Comprising Electrical Components, 2020. 21st International Conference on Thermal, Mechanical and Multi-Physics Simulation and Experiments in Microelectronics and Microsystems.

European Search Report and Written Opinion received Feb. 16, 2021 in European Application No. EP20194020.2.

* cited by examiner

EXPANSION COEFFICIENT DETERMINATION WITH DEFORMATION MEASUREMENT AND SIMULATION

RELATED APPLICATIONS

The present application claims priority to EP Patent Application No. 20194020.2, filed Sep. 2, 2020, the contents of which are hereby incorporated by reference in their entirety.

BACKGROUND INFORMATION

Multi-layer circuit boards may be formed of stacks of metal layers and isolation layers. The isolation layers may be made of a (reversibly or irreversibly) deformable material, in particular thermally deformable material, such as a prepreg material. For example, after forming of the stack the prepreg material may be cured and shrinkage of the resin of the prepreg material, in which fibres are embedded, may lead to stress states inside the cured stacks. In general, stress states may be caused by deformation of the isolation layers due to expansion or shrinkage. To avoid such stress states and to detect problematic regions inside a multi-layer circuit board, possible layouts of multi-layer circuit boards may be simulated. For such simulations, the chemical shrinkage of the prepreg material as well as thermal expansion coefficients may need to be known with high accuracy.

CN 110 631 906A describes a material parameter acquisition method based on digital image correlation and finite elements. By combining a digital image related method and a finite element method, material parameters of the sample are obtained.

WO 2019 124 062 A1 relates to a prepreg material used in manufacturing of a semiconductor package provided with a chip and a substrate on which the chip is mounted. A coefficient of thermal expansion of the chip is measured with digital image correlation.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
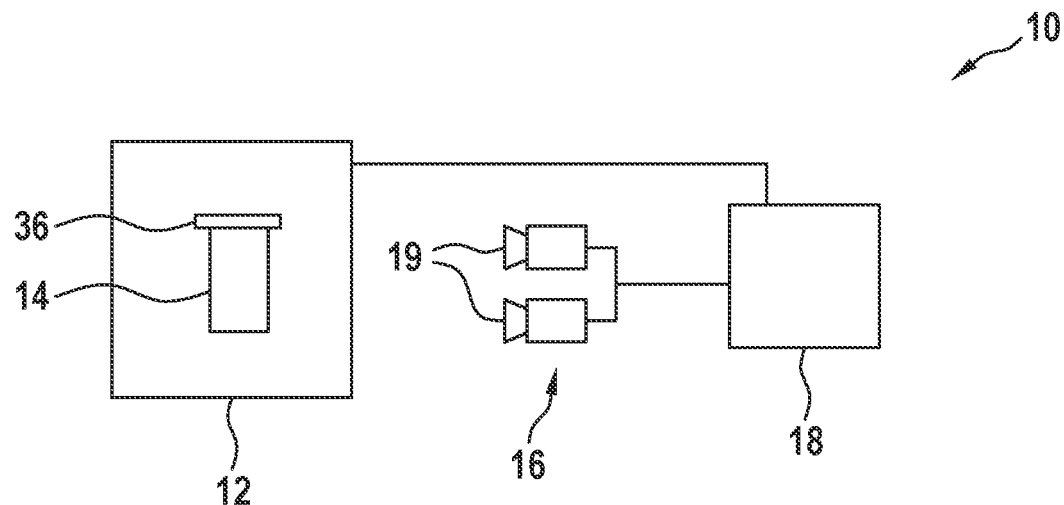
FIG. 1 schematically shows a test system according to an embodiment.

The embodiments herein relate to a method, a computer program, a computer-readable medium and a test system for determining an expansion coefficient of a test material.

An embodiment described herein is to accurately determine expansion coefficients of materials used in multi-layer circuit boards.

This embodiment is achieved by the subject-matter of the independent claims. Further exemplary embodiments are evident from the dependent claims and the following description.

A first aspect relates to a method for determining an expansion coefficient of a test material. The test material may be a prepreg material, such as FR-4, which may be used in manufacturing circuit boards. The expansion coefficient may also be seen as a shrinkage coefficient, when the expansion is negative. The expansion coefficient may indicate a thermal expansion and/or chemical shrinkage of the test material during curing. The expansion coefficient may be a function of environmental conditions, such as temperature and humidity and/or may be time-dependent with respect to a time an environmental condition is applied to the test material.

According to an embodiment, the method comprises: receiving first image data of a compound material, wherein the compound material comprises a plate and a layer of the test material, which is attached to the plate. The method further comprises: receiving at least one second image data of the compound material, which has been exposed to an environmental condition, before the second image data has been recorded. It maybe that image data is recorded continuously and/or that image data is recorded at a plurality of time steps. The image data of a time step may be compared with the image data of the first time step and/or with the image data of the previous time step.

The first and second image data may encode an image of the compound material in digital form. The image data may comprise depth information. The image data may have been recorded with a camera, such as a stereo camera.

The first image data may have been recorded before the compound material has been exposed to the environmental condition. The first image data may have been recorded with the compound material in a standard environmental condition, such as room temperature and/or a standard humidity. The second image data may have been recorded after and/or during an environmental condition different from the standard environmental condition, such as a curing process with a higher temperature.

The compound material may be composed of two layers, a layer of test material and a layer of a further material, which forms the plate. The compound material may be seen as a bi-material strip. The plate may be undeformable compared to the test material. The plate may be made of any material with a deformation coefficient smaller than the test material, for example with a deformation coefficient substantially 0. As an example, the plate may be made of metal. Between the recording of the first image data and the second image data, the compound material deforms, for example analogously to a bimetal strip. This movement and/or deformation may be determined from differences in the first image data and the second image data. Due to the two-layer structure, rather small local deformations may result in a much higher cumulated deformation of the compound material.

According to an embodiment, the method further comprises: determining a measured deformation of the compound material by comparing the first image data and the second image data. The deformation may be determined from depth information encoded into the image data. The deformation also may be determined from a deformation of the shape of the compound material. For points in the first image data it may be determined, where the respective point has moved. Therefrom, a movement of a point of the compound material before the exposure to the environmental condition to a point during and/or after the exposure may be determined.

The measured deformation may encode this movement of points and/or may encode a shape of the compound material after the exposure to the environmental condition.

According to an embodiment, the method further comprises: performing a simulated deformation of a model of the compound material exposed to the environmental condition and determining the expansion coefficient of the test material by varying the expansion coefficient until the simulate deformation conforms to the measured deformation. Additionally to the measured deformation, which is determined from the image data, simulated deformations may be determined. The simulated deformations may be determined by performing a simulation of a model of the compound material with different expansion coefficients for the test material. Other properties of the compound material may be fixed, such as the shape, the thicknesses of the layers of the compound material, an expansion coefficient of the plate, etc. The simulation may be performed with a finite elements method. With the simulation, deformations for different expansion coefficients may be tested and compared to the measured deformation.

The expansion coefficient may be determined with an optimization process, wherein an objective function, which quantifies a difference of the measured deformation and the simulated deformation, is minimized.

According to an embodiment, the measured deformation of the compound material is determined by determining a distance of points of the compound material with respect to a plane, in which the compound material extends. Before the exposure to the environmental condition, the compound material may have a flat shape, i.e. may have two flat surfaces and/or may extend along to the plane. During and/or after the exposure, the compound material may warp and/or may be warped and this may be determined by a movement of the specific points of the compound material orthogonal to the plane defined by the undeformed compound material.

The measured deformation may comprise points and their movement between the acquisition of the first image data and the second image data. From the simulation, also a movement of these points may be determined. An objective function for quantifying a difference of measured and simulated deformation may be based on the movement distances determined from the image data and the simulation.

The compound material may be provided in the form of a strip, wherein a part of the strip is fixated and another part is allowed to move freely, when the strip is exposed to the environmental condition. For example, an end of the strip may be fixated and the other end is allowed to move freely. As another example, a center of the strip may be fixated.

According to an embodiment, the first image data and the second image data comprises depth information. For example, the first image data and the second image data comprise stereo images. Depth information may be information, which encode a distance of a point in the image data to the recording device, such as a camera. It also may be that the first image data and second image data comprise 3D pixels, which for example may be provided by a time-of-flight camera.

According to an embodiment, a pattern is provided on the compound material and the first image data and the second image data comprise an image of the pattern. The measured deformation may be determined by comparing the pattern in the first image data and the pattern in the second image data.

The pattern may be printed, sprayed, coated or manually applied to the layer of the test material. When the compound material is provided as a strip, which is fixated at a part, the pattern then may be provided on the part allowed to move freely or on the complete compound material. During the exposure to the environmental condition, the compound material and therefore the pattern applied to it may move and/or may deform. Differences of the patterns in the first and second image data may be determined with digital image correlation.

According to an embodiment, the pattern comprises speckles. Speckles may be irregular dots with varying diameter. The measured deformation is determined with digital image correlation of the speckles in the first image data and the pattern in the second image data.

According to an embodiment, the test material comprises fibres embedded into a resin. The fibres and/or a fabric, which may be glass fibres and/or carbon fibres, may influence the expansion coefficient of the resin alone with respect to a different direction. The fibres may be oriented along warp and weft directions. Therefore, expansion coefficients may be determined with respect to at least two directions. The expansion coefficient may be seen as a tensor. These direction dependent expansion coefficients may be input into the simulation, in which also an orientation of the fibres (such as warp and weft directions) is modelled. The warp/weft interaction of a fabric with the resin may be determined with the method.

According to an embodiment, the environmental condition comprises at least one of: a temperature, to which the compound material is exposed; a humidity, to which the compound material is exposed; and/or a fluid, to which the compound material is exposed. The fluid may be a gas, such as air or nitrogen, and liquid, such as water or an oil. The method not only may be used for determining the shrinkage of a prepreg material but also for other types of material.

According to an embodiment, the environmental condition comprises at least one of: an electromagnetic filed, to which the compound material is exposed; a current and/or voltage applied to the compound material. For example, the plate of the compound material may be electrically conducting. A voltage may be applied to the plate and/or may be induced in the plate, such that a current flows through the plate.

According to an embodiment, image data at a plurality of time steps during the exposure to the environmental condition is recorded. A measured deformation of the compound material may be determined for the plurality of time steps. The simulation may be performed over time and the determination of the expansion coefficient may be based on comparing the measured deformation with the simulated deformation at the plurality of time steps. This may increase the accuracy of the expansion coefficient determination. It also may be that further characteristics of the compound material are indicated and a deeper understanding of its material properties is reached.

According to an embodiment, a time dependent expansion coefficient is determined. It also may be that the expansion coefficient (even under a time independent environmental condition) is time dependent. For example, the expansion coefficient may increase or lower with increasing time difference to the start, when the compound material is exposed to the environmental condition.

According to an embodiment, the compound material is exposed to an environmental condition, which changes over time. For example, the temperature and/or the humidity may be varied during the exposure. These variations also may be included into the simulation of the compound material. The environmental condition, which changes over time, may be controlled by a device, which also performs the simulation with the same parameters.

According to an embodiment, the test material comprises a thermally deformable material. The test material may be heated and may deform reversibly or irreversibly due to the temperature change.

The thermally deformable material may be a prepreg material. A prepreg material may comprise a resin, which is cured during the exposure to a specific environmental condition, such as a high temperature. For example, the prepreg material may be FR-4 dielectric containing a glass cloth.

According to an embodiment, the environmental condition may comprise a heating of the compound material for curing the test material, such as a prepreg material. In this case, the expansion coefficient may specify a chemical shrinkage of the test material.

In general, the test material may comprise a resin, which may be reinforced or non-reinforced. Such resins may include an epoxy resin and/or a bismaleimide-triazine resin.

Other test materials may be made of and/or may comprise cyanate ester, polyphenylene derivate, glass (in particular glass fibers, multi-layer glass, glass-like materials), prepreg material (such as FR-4 or FR-5) polyimide, polyamide, liquid crystal polymer (LCP), epoxy-based build-up film, polytetrafluoroethylene (Teflon), ceramics and/or a metal oxide.

According to an embodiment, the model of the compound material used for the simulation models the test material and the plate. The model also may contain information on fibres (for example from a fabric) embedded into a resin), in particular a direction of the fibres and/or warp and weft directions. The simulation for determining the simulated deformation may be performed with a preset expansion coefficient of the plate of the compound material. The plate of the compound material may be a homogenous plate with isotropic known expansion coefficients.

A further aspect relates to a computer program for determining an expansion coefficient of a test material, which, when being executed by a processor, is adapted to perform the steps of the method as described herein. In particular, the computer program may be adapted for: receiving the first image and the second image data; determining a measured deformation of the compound material by comparing the first image data and the second image data; performing the simulated deformation of the model of the compound material exposed to the environmental condition; and determining the expansion coefficient of the test material by varying the expansion coefficient until the simulate deformation conforms with the measured deformation.

It also may be that the computer program controls a test system. For example, the computer program may control a camera device to record the image data. The computer program also may control an exposure device by setting environmental conditions to which the compound material is exposed.

A further aspect relates to computer-readable medium, in which such a computer program is stored. A computer-readable medium may be a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect relates to a usage of the expansion coefficient determined with the method described herein for simulating a circuit board comprising the test material and exposed to the environmental condition. As already mentioned, chemical shrinkage coefficients of prepreg materials may be determined and these chemical shrinkage coefficients may be used in mechanical, thermal and/or thermo-mechanical simulations of circuit boards. It has to be noted that the test material, which has been tested with the method, may be attached to other kinds of plates and metal layers as have been used during the method.

The test material may be a prepreg material used in circuit board manufacturing. The environmental condition may be a heating of the compound material for curing the prepreg material. A test material with fibres embedded into a resin may be modelled in the simulation of the circuit board and that fibre direction and/or direction dependent expansion coefficients may be included into the model of the circuit board. The expansion coefficient may indicate a prepreg shrinkage during curing. By determining prepreg shrinkage and using it in a simulation, the accuracy of the results of warpage calculation can be improved. Warpage problems can be predicted and solved even before manufacturing.

A further aspect relates to a test system. The test system comprises an exposure device, such as an oven, for exposing the compound material to an environmental condition, a camera device for recording image data of the compound material, and an evaluation device for receiving the image data and for performing the method as described herein. It may be that the test system comprises a light source for illuminating the compound material. The exposure device may be a controllable oven, in which environmental conditions of the compound material, such as temperature and/or humidity, may be set, for example under the control of the evaluation device. The camera device may comprise a 3D camera and/or a stereo camera for recording the image data, for example under control of the evaluation device. The evaluation device may be a PC or other type of computing device, in which the computer program mentioned above may be run.

It has to be understood that features of the method as described in the above and in the following may be features of the computer program, the computer-readable medium and the test system as described in the above and in the following.

These and other aspects will be apparent from and elucidated with reference to the embodiments described hereinafter.

FIG. 1 shows a test system 10, which comprises an exposure device 12 accommodating a compound material 14, a camera device 16 and an evaluation device 18.

The exposure device 12 may be an oven possibly in combination with a humidifier, which may be controlled to expose the compound material to different temperatures, heat the compound material and/or humidify the air inside the oven. It also is possible that the exposure device 12 exposes the compound material to specific gases and/or liquids. The exposure device 12 may be controlled by the evaluation device 18. In general, the exposure device 12 is adapted for or exposing the compound material 14 to different environmental conditions, such as described above.

The compound material 14 may have the form of a plate and/or strip, which is fixed at one end, while the other end is free movable. As a further example, the compound material 14 may be provided in the form of a disk, which is fixated at the center.

The camera device 16 is arranged to record image data of the compound material 14. As shown, the camera device 16 may be a stereo camera system and/or may comprise two cameras 19, which are directed towards the compound material 14, which may be situated behind a window of the exposure device 12. It also is possible that the camera device 16 is a time-of-flight camera, which produces image data with pixelwise depth information. The camera device 16 may be controlled by the evaluation device 18 and/or the image data may be sent to the evaluation device 18. A light source may be provided, which illuminates the compound material 14.

The evaluation device 18 is adapted for receiving the image data and for performing the method for determining an expansion coefficient of the compound material as described herein. The evaluation device 18 may be a PC or other computing device with a processor and memory, in which a computer program is stored, which, when executed, performs the method. It has to be noted that the determination of the expansion coefficient is performed contactless, since the image data can be recorded from a distance to the compound material 14.

Figure 2:
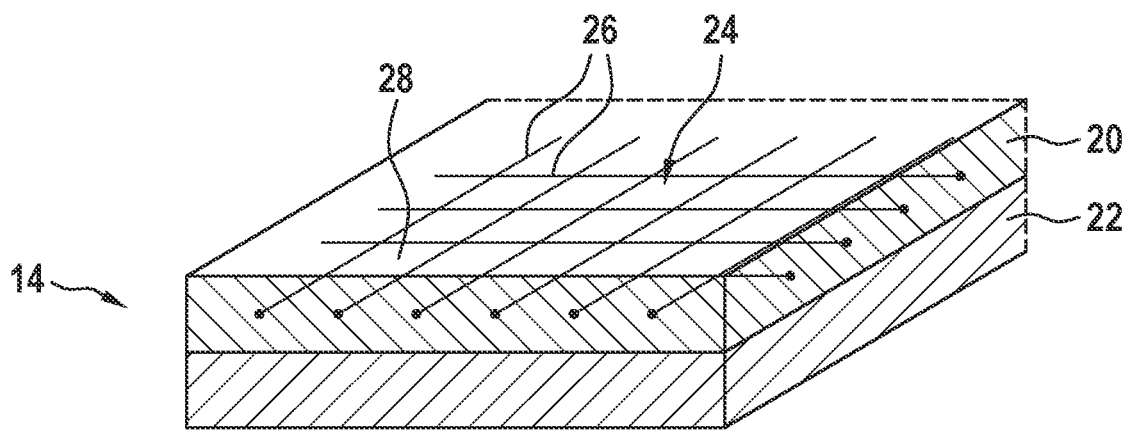
FIG. 2 schematically shows a cross-sectional view of a compound material used in the test system of FIG. 1.

FIG. 2 shows a cross-sectional perspective view of the compound material 14. The compound material has the shape of a plate and is composed of a test material 20 attached to a plate 22. The plate 22 may be a metal plate, such as an aluminium plate. The plate is chosen to have known material properties with respect to the different environmental conditions. Here, the test material 20 is a prepreg material with a fabric 24 of fibres 26 embedded into a curable resin 28. Due to the fabric, the expansion coefficient of the test material 20 may be inhomogeneous with respect to different directions.

Figure 3:
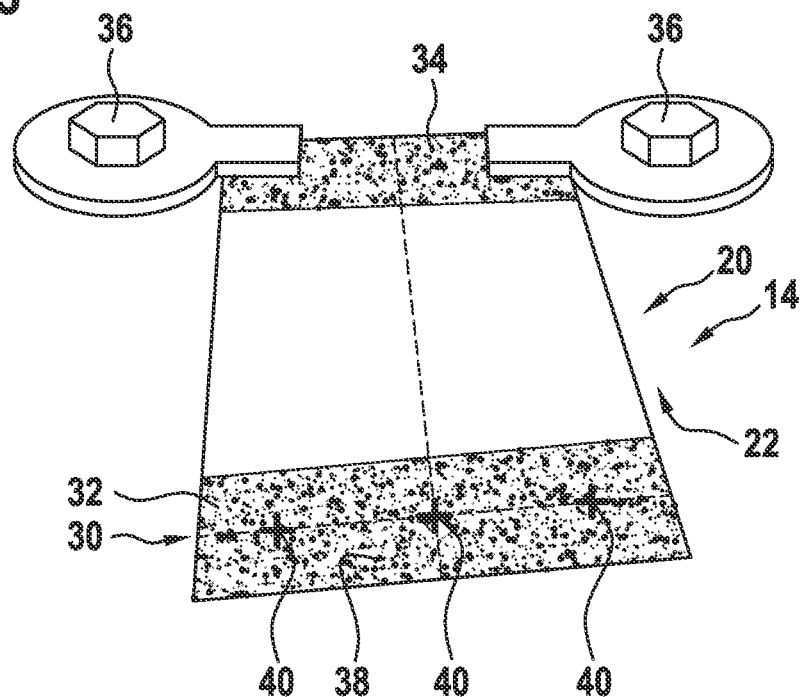
FIG. 3 shows a perspective view of a deformed compound material.

FIG. 3 shows an example of a compound material 14, in particular an aluminium plate 22 with a prepreg material 20, which has been cured by heating for a specific time. At ends, the compound material 14 has been sprayed with a pattern 30 in the form of irregular speckles 32. It also can be seen that the strip of compound material 14 is fixated at one end 34 with a fixation means 36 and that the other end 38 has been moved during the curing (more general the exposure to an environmental condition) of the prepreg material 20. This was caused by the deformation of the compound material 20 during the curing. As shown in FIG. 3, the fixation means 36 may comprise a fixed bearing (left) and a floating bearing (right).

As the compound material 14 is a bi-material strip and the test material 20 and the plate 22 have different expansion coefficients, it may deform analogously to a bimetal strip under temperature changes. However, in the present method, also other processes not restricted to different temperatures can be considered.

FIG. 3 also shows, how a deformation of the compound material 14 may be specified. At specific points 40, a distance to a plane, in which the undeformed compound material 14 was aligned, may be determined. This determination may be done with the camera device 16, for example by digital image correlation based on the pattern 30 and in particular the speckles 32. In general, other points as shown in FIG. 3 may be used as shown in FIG. 3. For example, all points in the image data may be used.

Figure 4:
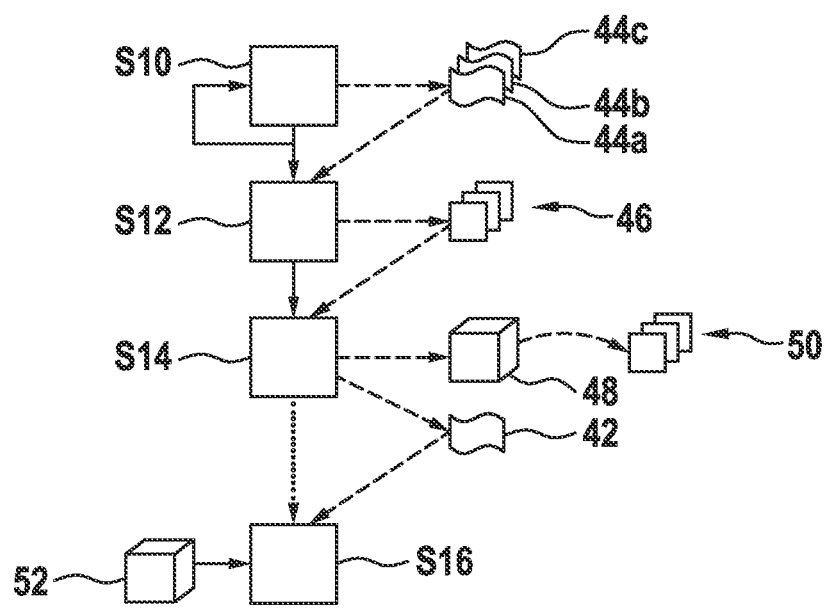
FIG. 4 shows a flow diagram for a method according to an embodiment.

FIG. 4 shows a flow diagram for a method that may be performed by the evaluation device 18. With the method, an expansion coefficient 42 of the test material 20 is determined.

In step S10, the exposure device 12 is controlled to change an environmental condition for the compound material 14. For example, a temperature and/or a humidity is changed. It is also possible that a fluid, such as a gas, is introduced into an interior space of the exposure device 12. As a specific example, the environmental condition comprises a heating of the compound material 14 for curing a prepreg material. The environmental condition to which the compound material 14 is exposed may change over time, for example different temperatures and/or humidities may be set with advancing time.

In parallel to this, the camera device 16 is controlled to record image data 44a, 44b, 44c. First image data 44a may be recorded before the environmental condition starts to change, i.e. during a standard environmental condition. Second image data 44b may be recorded after curing or after the exposure to the environmental condition different to the standard environmental condition. It also may be that a series of image data 44a, 44b, 44c is recorded. The image data 44a, 44b, 44c may be recorded at a plurality of time steps during the exposure to the environmental condition is recorded. The image data and in particular the first image data 44a and the second image data 44b are received in the evaluation device 18.

As already mentioned, the camera device 16 may be a 3D camera device and the image data 44a, 44b, 44c may comprise depth information. For example, the image data 44a, 44b, 44c comprise stereo images or a pixelwise depth information.

In step S12, the evaluation device 18 determines a measured deformation 46 of the compound material 14 by comparing the image data and in particular the first image data 44a and the second image data 44b. The measured deformation is an indicator about the deformation or warpage of the compound material 14. For example, the distances of the points 40 (see FIG. 3) with respect to a plane, the compound material 14 was originally aligned may be such an indicator.

The measured deformation 46 may be determined by comparing the pattern 30 in the image data 44a, 44b, 44c, for example with digital image correlation.

The measured deformation 46 of the compound material 14 may be determined for a plurality of time steps, i.e. the measured deformation may be a (discrete) function over time. In particular, this may be done, when also the environmental condition changes over time.

In step S14, the evaluation device 18 performs a simulated deformation of a model 48 of the compound material 14. The simulation is performed by simulating the same environmental condition and/or the same change of environmental condition over time, as the compound material 14 in reality was exposed in the exposure device 12.

Figure 5:
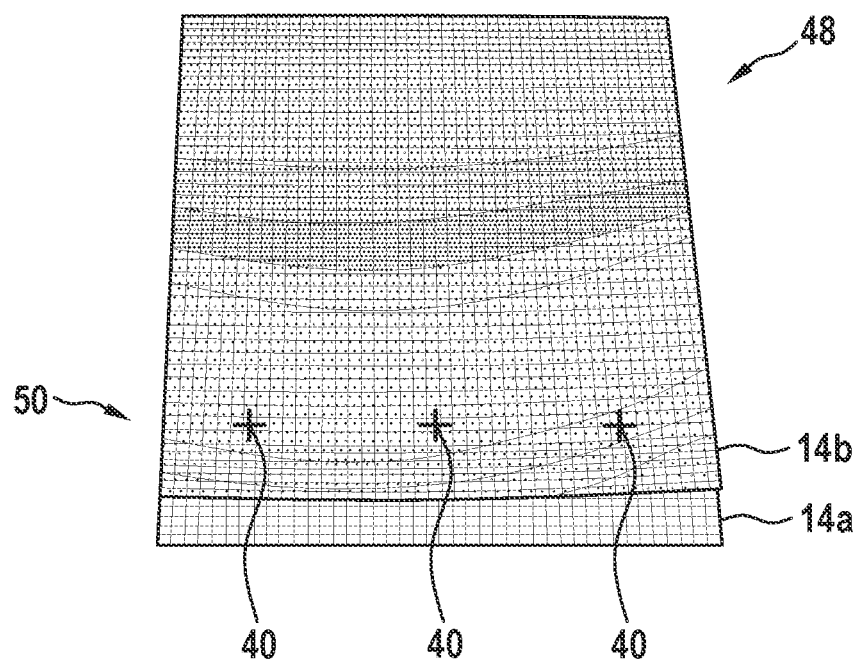
FIG. 5 shows a visualization of a model of the compound material of FIGS. 2 and 3.

The simulation may be performed with finite elements. The model 48 of the compound material 14 may be based on a mesh as shown in FIG. 5. In the model 48 of the compound material 14, the test material 20 and the plate 22 and respective material parameters are encoded. Such material parameters comprise an expansion coefficient 42 of the test material 20 and of the material of the plate 22. The expansion coefficient 42 of the test material 20 may be inhomogeneous with respect to different directions and in such a way, also an interaction between the fibres 26 and/or the fabric 25 may be modelled.

FIG. 5 also shows an indicator for a simulated deformation 50. The same points 40 as in the image data 44a, 44b, 44c (see also FIG. 3) may be identified in the model 48 and distances of these points between a simulated undeformed compound material 14a and a simulated deformed compound material 14b may be determined.

Returning to FIG. 4, in step S14, an expansion coefficient 42 of the test material 20 is determined by varying the expansion coefficient 42 until the simulate deformation 50 conforms to the measured deformation 46. As already mentioned, a direction dependent expansion coefficient 42 and/or expansion coefficients 42 with respect to at least two directions may be determined in this way.

For example, an objective function based on a difference of the measured deformation 46 and the simulated deformation 50 may be evaluated and minimized. The objective function may be based on differences of the distances of the points 40 in the measured deformation 46 and the simulated deformation 50.

When the objective function is minimal, it may be assumed that the expansion coefficient 42 used in the simulation fits best to the real one.

During the simulation, also a time behaviour of the deformation can be considered. The simulation may be performed over time and the determination of the expansion coefficient 42 may be based on comparing the measured deformation 46 with the simulated deformation at a plurality of time steps. This again may be done with the points 40. In this case, a time dependent expansion coefficient 42 may be determined.

In step S16 a circuit board is simulated. Step S16 may be performed with a computing device different from the evaluation device. A model 52 of the circuit board is generated, into which the expansion coefficient 42 determined in step S14 is input. The model 52 may comprise one or more layers of the test material 20, in particular of different shape and/or thickness as the test material 20 in the compound material 14. During the simulation, the simulated circuit board may be exposed to the environmental condition as the one in step S10. In the case of a prepreg material, the expansion coefficient 42 may specify a chemical shrinkage and the curing of the circuit board may be simulated. With the simulation, a warpage of the circuit board can be predicted. Warpage problems can be solved before manufacturing.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 test system
12 exposure device
14 compound material
16 camera device
18 evaluation device
19 camera
20 test material
22 plate
24 fabric
26 fibres
28 resin
30 pattern
32 speckles
34 first part/end
36 fixation means
38 second part/end
40 point
42 expansion coefficient
44a first image data
44b second image data
44c further image data
46 measured deformation
48 model
50 simulated deformation
52 model of circuit board

What is claimed is:

1. A method for determining an expansion coefficient of a test material, the method comprising:
receiving first image data of a compound material, wherein the compound material comprises a plate and a layer of the test material, which is attached to the plate;
receiving at least one second image data of the compound material, which has been exposed to an environmental condition, before the at least one second image data has been recorded;
determining a measured deformation of the compound material by comparing the first image data and the at least one second image data; and
performing a simulated deformation of a model of the compound material exposed to the environmental condition and determining the expansion coefficient of the test material by varying the expansion coefficient until the simulated deformation conforms to the measured deformation, wherein:
the test material comprises fibers embedded into a resin;
expansion coefficients of the test material with respect to at least two directions are determined; and
the model includes information on warp and weft directions of the fibers.

2. The method of claim 1,
wherein the measured deformation of the compound material is determined by determining a distance of points of the compound material with respect to a plane, in which the compound material extends.

3. The method of claim 1, wherein at least one of:
the first image data and the at least one second image data comprise depth information; or
the first image data and the at least one second image data comprise stereo images.

4. The method of claim 1, wherein:
a pattern is provided on the compound material and the first image data and the at least one second image data comprise an image of the pattern; and
the measured deformation is determined by comparing the pattern in the first image data and the pattern in the at least one second image data.

5. The method of claim 4, wherein at least one of:
the pattern comprises speckles; or the measured deformation is determined with digital image correlation of the pattern in the first image data and the pattern in the at least one second image data.

6. The method of claim 1, wherein the environmental condition comprises at least one of:
a temperature, to which the compound material is exposed;
a humidity, to which the compound material is exposed;
a fluid, to which the compound material is exposed;
an electromagnetic filed, to which the compound material is exposed; or
at least one of a current or a voltage applied to the compound material.

7. The method of claim 1, wherein:
image data at a plurality of time steps during the exposure to the environmental condition is recorded;
a measured deformation of the compound material is determined for the plurality of time steps; and
the simulation is performed over time and the determination of the expansion coefficient is based on comparing the measured deformation with the simulated deformation at the plurality of time steps.

8. The method of claim 7, wherein at least one of:
a time dependent expansion coefficient is determined; or
the compound material is exposed to an environmental condition, which changes over time.

9. The method of claim 1, wherein:
the test material comprises a thermally deformable material;
the environmental condition comprises a heating of the compound material for curing the test material; and
the expansion coefficient specifies a chemical shrinkage of the test material.

10. The method of claim 1, wherein at least one of:
the model of the compound material models the test material and the plate;
the simulated deformation is performed with a preset expansion coefficient of the plate of the compound material; or
the plate is at least one of a metal plate or an aluminium plate.

11. A system, comprising:
an exposure device for exposing a compound material to an environmental condition;
a camera device for recording image data of the compound material; and
an evaluation device for receiving the image data and for performing the steps of:
receiving first image data of a compound material, wherein the compound material comprises a plate and a layer of test material, which is attached to the plate;
receiving at least one second image data of the compound material, which has been exposed to an environmental condition, before the at least one second image data has been recorded;
determining a measured deformation of the compound material by comparing the first image data and the at least one second image data; and
performing a simulated deformation of a model of the compound material exposed to the environmental condition and determining an expansion coefficient of the test material by varying the expansion coefficient until the simulated deformation conforms to the measured deformation, wherein:
the test material comprises fibers embedded into a resin;
expansion coefficients of the test material with respect to at least two directions are determined; and
the model includes information on warp and weft directions of the fibers.

* * * * *